United States Patent Office 3,008,916
Patented Nov. 14, 1961

3,008,916
PROCESS OF PREPARING CURED ELASTOMERIC COPOLYMER OF VINYLIDENE FLUORIDE AND HEXAFLUOROPROPENE
John F. Smith, Wilmington, Del., assignor to E. I. du Pont de Nemours and Company, Wilmington, Del., a corporation of Delaware
No Drawing. Filed Sept. 12, 1958, Ser. No. 760,547
1 Claim. (Cl. 260—41)

The present invention is directed to a novel process for curing selected fluoroelastomers. In particular, this invention relates to a process for curing elastomeric copolymers of vinylidene fluoride with hexafluoropropene by using as a curing formulation a combination of (1) a selected dithiol, (2) an aliphatic tertiary amine, and (3) magnesium oxide. This invention also is directed to the cured fluoroelastomer obtained by the described novel curing process.

Fluoroelastomers made by copolymerizing vinylidene fluoride with hexafluoropropene may be cured by ionizing radiation, or, by chemical means. In the latter case, the curing agents used are generally diamines or certain of their salts such as hexamethylenediamine carbamate. These curing agents are rather slow to cure and require temperatures up to about 200° C. for about 24 hours or longer to develop maximum properties in the elastomer. When using these elastomers for molded goods, it is impractical to hold the molded elastomer in the mold for such long periods; therefore, a two-step procedure has been developed. This procedure requires that the compounded elastomer be placed in the mold and held at a relatively low temperature for a short time so that enough curing occurs to give sufficient strength to the molded article in order that it can be physically removed from the mold and handled without deformation, then, the partially cured article is cured to its maximum properties by placing it in an oven at a somewhat higher temperature for the required length of time, usually about 24 hours.

It has now been found, that by means of the present invention whereby a compounding formulation of organic aliphatic or aromatic dithiols, aliphatic tertiary amines and magnesium oxide are used in the curing recipe for these fluoroelastomers, a rapid curing action is obtained which enables the elastomer to be cured in a reasonably short time. In addition, another advantage of this invention is that high states of cure are obtained, as measured by compression set values, in a relatively short curing cycle. Still other advantages of the present process are that the cured elastomers have excellent tensile strength and low compression set. It is of significance that the processability of the formulated elastomers is good due to the lack of any excessive scorchiness inherent in the process.

It is an object of the present invention to provide a novel process to effect maximum curing properties in the described fluoroelastomers, said elastomers being cured in a reasonably short time. It is a further object of the present invention to achieve a high state of cure by compounding in said elastomer organic aliphatic or aromatic dithiols, aliphatic tertiary amines and magnesium oxide in the manner described. It is still a further object of the present invention to produce a cured fluoroelastomer product having improved tensile strength and compression. These and other objects will become apparent in the following description and claim.

More specifically, the present invention is directed to a process for curing an elastomeric copolymer consisting of 30 to 70 percent by weight of vinylidene fluoride and 70 to 30 percent by weight of hexafluoropropene which process comprises compounding with each 100 parts of elastomer (a) 0.2 to 2 parts of an organic aliphatic or aromatic dithiol, (b) 0.2 to 1 part of an aliphatic or cycloaliphatic tertiary amine, and (c) 2.5 to 25 parts of magnesium oxide, followed by curing the compounded elastomer at about 150° C. for about 60 minutes and completing the curing process at about 200° C. for about 2 to 24 hours.

The present invention is also directed to the cured elastomer produced according to the process described and claimed.

The process of the present invention is applicable to fluoroelastomers which are copolymers of vinylidene fluoride with hexafluoropropene. In order for these copolymers to be elastomers they will generally contain from about 30 to about 70 percent by weight of the vinylidene fluoride units, the balance being hexafluoropropene. The preferred elastomeric copolymer will contain between about 53 and 70 percent by weight of vinylidene fluoride. These elastomers are commercially available. The copolymer of vinylidene fluoride and hexafluoropropene is described in Industrial and Engineering Chemistry, vol. 49, p. 1687 (1957).

Compounding of the fluoroelastomer is carried out in the conventional manner using conventional equipment. The ingredients of the compounding recipe are added in any sequence to the fluoroelastomer as it is banded on the rubber mill.

Typical organic aliphatic and aromatic dithiols used in the present invention are ethers such as dimercaptodimethylether ($HS-CH_2-O-CH_2-SH$), mercaptoethylmercapto-n-butyl ether

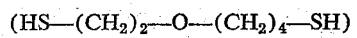

thioethers such as dimercaptomethylsulfide

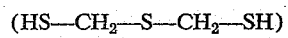

dimercaptodi-n-butylsulfide

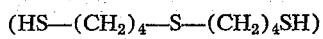

alkylene dithiols such as 1,2-ethanedithiol

1,6-hexanedithiol ($HS-(CH_2)_6-SH$), esters such as ethylenebismercaptoacetate

hexamethylene-bis($\epsilon$-mercaptocaproate), di-2-mercaptoethyl adipate, and aromatic dithiols such as 1,5-naphthalenedithiol, 2,7-naphthalenedithiol, 4,4'-dimercaptodiphenyl. Ethylene-bis-mercaptoacetate, also called ethylene-bis-thioglycolate, is readily available commercially and is thus a preferred agent.

These dithiol compounds are known compounds and may be prepared by known methods for making dithiols (see for example Wagner and Zook, Synthetic Organic Chemistry, Wiley, 1953).

The amount of dithiol used in compounding the fluoroelastomer will be between about 0.2 to about 2 parts per 100 parts of elastomer. When less than this amount is used the cure obtained is somewhat inferior in that lower tensile strength values result. Using more than 2 parts can cause an overcured product and is to be avoided.

The amine used in conjunction with the dithiol will be selected from the class of aliphatic and cycloaliphatic tertiary amines. Aromatic or heterocyclic tertiary amines are inoperable in that no cure is obtained. Usually the aliphatic tertiary amine will be a di-lower alkyl-higher alkyl (or cycloalkyl) amine such as dimethyldodecylamine, dimethyltetradecylamine, diethylhexadecylamine, and methylethyloctadecylamine. Other amines such as dimethylcyclohexylamine, dimethyl-n-butylamine, triethylamine, and the like are also useful. The preferred amine is dimethyldodecylamine. The tertiary amines may be incorporated in the form of their acid salts. This is preferred in the case of the more volatile tertiary amines.

The amount of tertiary amine used in the formulation will be between about 0.2 and about 1 part per 100 parts of fluoroelastomer. Using more than this amount results in overcured products while use of less than 0.2 part results in a slow cure with inferior properties in the final product.

In addition to the dithiol and the tertiary amine it is necessary to compound the fluoroelastomer with magnesium oxide. The amount of magnesium oxide used should be beween about 2.5 and about 25 parts per 100 parts of fluoroelastomer. More than 25 parts of magnesium oxide yield a hard, stiff product. On the other hand, using less than about 2.5 parts per 100 parts of fluoroelastomer does not give a good cure.

It will be understood that the fluoroelastomer may be compounded to contain fillers such as carbon black, silica, etc., and, plasticizers, dyes, and other materials when warranted by the properties desired.

The compounded fluoroelastomer is readily processable on conventional rubber machinery. The compounded stock has good processing properties and its resistance to scorch is equal to or better than curing systems previously used for fluoroelastomers.

After the fluoroelastomer is compounded it is cured, usually in two steps. First, the compounded elastomer is shaped as desired in a mold or press and held at a temperature of 150° to 200° C. for about 60 minutes. Then, after the shaped elastomer is removed from the mold, it is transferred to an oven and held at about 200° C. to complete the cure. The time will vary from about 2 to about 24 hours depending on the particular recipe used.

After removal from the curing oven, the fluoroelastomer is found to have excellent properties; e.g., high tensile strength, good compression set, and good appearance, retaining the dimensions of the mold.

Representative examples illustrating the present invention follow; all parts are by weight.

*Example 1*

100 parts of a copolymer of 59 percent by weight of vinylidene fluoride and 41 percent by weight of hexafluoropropene was compounded on a water-cooled rubber mill with 15 parts of magnesium oxide, 18 parts of MT (medium thermal) carbon black, 0.5 part of dimethyldodecylamine, and 1 part of dimercaptomethylsulfide (HS—$CH_2$—S—$CH_2$—SH). The compounded elastomer was then placed in a mold at 150° C. for 60 minutes. The molded article was then removed from the mold without difficulty and the cure completed in an oven at 200° C. for 24 hours. The cured polymer had exactly copied the contour of the mold giving clean, sharp impressions. The physical properties of the cured elastomer follows:

Tensile at break (lbs./in.$^2$) _____ 2300
Elongation at break (percent) _____ 210
Modulus—200 (lbs./in.$^2$) _____ 2080

*Example 2*

Following the procedure of Example 1, 100 parts of a copolymer of 39 percent by weight of vinylidene fluoride and 61 percent by weight of hexafluoropropene was compounded with 15 parts of MgO, 18 parts of MT black, 0.4 part of dimethyldodecylamine and 0.6 part of ethylenebismercaptoacetate. After curing in the mold at 150° C. for 60 minutes, the product was cured further in an oven at 204° C. for 18 hours. The physical properties of the final product follows:

Tensile at break (lbs./in.$^2$) _____ 2320
Elongation at break (percent) _____ 360
Modulus—200 (lbs./in.$^2$) _____ 850

100 parts of the same copolymer used above was compounded with 15 parts of magnesium oxide, 18 parts of MT black and 1 part of hexamethylenediamine carbamate, and cured simultaneously with the above sample. The following properties were obtained:

Tensile at break (lbs./in.$^2$) _____ 1680
Elongation at break (percent) _____ 360
Modulus—200 (lbs./in.$^2$) _____ 850

Comparison of the properties of the two samples demonstrates the superiority in tensile strength properties of the dithiol cured stock.

*Example 3*

Following the procedure of Example 1, three samples of a copolymer containing 59 percent by weight of vinylidene fluoride and 41 percent by weight of hexafluoropropene were compounded as follows:

|  | A | B | C |
|---|---|---|---|
| Fluoroelastomer | 100 | 100 | 100 |
| Magnesium Oxide | 15 | 15 | 15 |
| MT Black | 18 | 18 | 18 |
| Hexamethylenediamine Carbamate |  |  | 1 |
| Dimethyldodecylamine | 0.5 | 0.5 |  |
| Ethylene-bis-mercaptoacetate | 0.8 | 0.8 |  |

The compounded elastomers were subjected to cures as follows:

|  | A | B | C |
|---|---|---|---|
| Mold Cure: |  |  |  |
| Minutes | 60 | 60 | 60 |
| Temp. °C | 150 | 150 | 150 |
| Oven Cure: |  |  |  |
| Hours | None | 2 | 24 |
| Temp. °C |  | 204 | 204 |

On evaluation of stress-strain properties, the cured elastomers gave the following values:

|  | A | B | C |
|---|---|---|---|
| Tensile at Break (Lbs./in.$^2$) | 1,800 | 2,350 | 1,470 |
| Elongation at Break (percent) | 410 | 300 | 270 |
| Modulus—200 (Lbs./in.$^2$) | 860 | 1,350 | 940 |

It can readily be seen that the combination of dithiol, tertiary amine and magnesium oxide give a rapid curing system. After only one hour in the mold and without an oven cure, very good properties are developed (Sample A). When cured further in an oven for only two hours, the properties were better than those obtained by a 24-hour cure with the control hexamethylenediamine carbamate curing agent (B vs. C).

*Example 4*

A copolymer containing 59 percent by weight of vinylidene fluoride and 41 percent by weight of hexafluoropropene was compounded on a water-cooled rubber mill according to the following formulations, all parts by weight:

|  | A | B | C |
|---|---|---|---|
| Copolymer | 100 | 100 | 100 |
| Magnesium Oxide | 10 | 15 | 15 |
| Silica | 10 | | |
| MT Black | | 18 | 18 |
| Dimethyldodecylamine | 0.2 | 0.5 | 0.5 |
| Ethylene-bis-mercaptoacetate | 1.0 | | |
| 1,5-Naphthalenedithiol | | 1.0 | |
| 2,7-Naphthalenedithiol | | | 0.6 |

The compounded stocks were then molded and heated in the mold at 150° C. for 1 hour, removed from the mold, and heated in an oven at 200° C. for 24 hours.

The resulting cured elastomers had the following properties:

|  | A | B | C |
|---|---|---|---|
| Tensile strength at break, lbs./sq. in | 3,050 | 2,650 | 2,750 |
| Elongation at break, percent | 410 | 300 | 380 |
| Modulus at 200% elongation, lbs./sq. in | 1,000 | 1,600 | 1,260 |
| Compression set | (¹) | 16 | 16 |
| Hardness | (¹) | 68 | 67 |

¹ Not determined.

Example 5

Following the procedure of Example 1, the same elastomer was compounded as follows:

|  | Parts by Weight | |
|---|---|---|
|  | A | B |
| Elastomer | 100 | 100 |
| MT Black | 18 | 18 |
| Magnesium Oxide | 15 | 15 |
| Triethylamine | | 0.8 |
| Diethylcyclohexylamine | 1 | |
| Ethylene-bis-mercaptoacetate | 1 | 0.8 |

After curing in a mold and oven as described in Example 1, the following properties were measured:

|  | A | B |
|---|---|---|
| Tensile at Break (Lbs./in.²) | 2,000 | 2,200 |
| Elongation at Break (percent) | 250 | 280 |
| Modulus—200 (Lbs./in.²) | 1,550 | 1,450 |
| Compression Set | 18 | 23 |
| Hardness | 68 | 66 |

Example 6

Eight samples of a copolymer of 59 percent by weight of vinylidene fluoride and 41 percent by weight of hexafluoropropene were formulated as follows:

|  | A | B | C | D | E | F | G | H |
|---|---|---|---|---|---|---|---|---|
| Copolymer | 100 | 100 | 100 | 100 | 100 | 100 | 100 | 100 |
| Magnesium oxide | 2.5 | 5.0 | 10 | 15 | 5 | 5 | 5 | 15 |
| MT Black | 18 | 18 | 18 | 18 | 18 | 18 | 18 | 18 |
| Dimethyldodecylamine | 0.5 | 0.5 | 0.5 | 0.5 | 0.5 | 0.5 | 0.5 | |
| Ethylene-bis-mercaptoacetate | 1 | 1 | 1 | | | | | |
| Hexamethylenedithiol | | | | | | 1 | | |
| Dimercaptodiethylether | | | | | | | 1 | |
| Dimercaptodiethylsulfide | | | | | 1 | | | |
| Dimercaptodimethylsulfide | | | | 1 | | | | |
| Hexamethylenediamine carbamate | | | | | | | | 1 |

After curing in a mold at 150° C. for 60 minutes and completing the cure at 204° C. for 24 hours, the following physical properties were observed:

|  | A | B | C | D | E | F | G | H |
|---|---|---|---|---|---|---|---|---|
| Tensile at Break (Lbs./in.²) | 1,950 | 2,100 | 2,250 | 2,300 | 1,620 | 1,800 | 2,000 | 1,470 |
| Elongation at Break (Percent) | 400 | 340 | 290 | 210 | 270 | 240 | 290 | 270 |
| Modulus—200 (Lbs./in.²) | 540 | 820 | 1,360 | 2,080 | 1,000 | 1,280 | 1,200 | 940 |
| Compression Set | 17 | 16 | 17 | | 12 | 9 | 11 | 36 |
| Hardness | 63 | 65 | 67 | | 65 | 65 | 64 | 67 |

It is readily observed that a significant improvement is obtained over the hexamethylenediamine carbamate cured stock (H) in tensile strength and compression set.

The various tests set forth in the preceding examples are conducted according to known and acceptable testing procedures as represented by ASTM–D–395–53T (Method B) and ASTM–D–412–51T.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows:

A process for preparing a cured elastomeric copolymer consisting of 30 to 70 percent by weight of vinylidene fluoride and 70 to 30 percent by weight of hexafluoropropene, said process comprising the compounding with each 100 parts of copolymer of (a) 0.2 to 2 parts of a dithiol compound selected from the group consisting of aliphatic and aromatic dithiols, (b) 0.2 to 1 part of a tertiary amine taken from the group consisting of aliphatic and cycloaliphatic tertiary mono amines, and (c) 2.5 to 25 parts of magnesium oxide, followed by initially curing the compounded elastomer by heating at a temperature of about 150° C. and completing the cure by heating at a temperature of about 200° C.

References Cited in the file of this patent

UNITED STATES PATENTS

| 2,598,407 | Marvel | May 27, 1952 |
| 2,820,776 | Robb et al. | Jan. 21, 1958 |
| 2,933,481 | Rugg | Apr. 19, 1960 |
| 2,941,987 | Dewey | June 21, 1960 |

OTHER REFERENCES

Dixon et al.: "Ind. and Eng. Chem.," volume 49, No. 10, October 1957, pages 1687–1690.